Patented May 26, 1936

2,042,056

UNITED STATES PATENT OFFICE 2,042,056

PROCESS FOR SWEETENING SOUR PETROLEUM OIL AND THE REVIVIFICATION OF THE SWEETENING AGENT

Oscar Codier, Houston, Tex., assignor, by mesne assignments, to Bennett-Clark Co., Inc., San Antonio, Tex., a corporation of Texas No Drawing. Application February 27, 1932, Serial No. 595,655

8 Claims. (Cl. 196—33)

The present invention relates to a process for sweetening sour petroleum oils and low boiling mineral oils such as gasoline, kerosene, naphthas and the like in order to sweeten them, and to the recovery or revivification of the sweetening agent.

Among the objects of the present invention is to sweeten heavy and light sour hydrocarbon oils of the kind indicated, and to regenerate or reactivate the agents used for sweetening the oils after they have been used in a sweetening operation, whereby the regenerated or revivified sweetening agents may be used in sweetening further quantities of sour oils.

The method commonly in use at the present time for sweetening oils of the kind indicated above involves the use of sulphur and a solution of litharge or lead oxide (PbO), in a water solution of sodium hydroxide, said solution being generally known as "doctor" solution or "plumbite" solution, the latter owing to the fact that the lead in such solution is acepted as being present in the form of sodium plumbite ($Na_2PbO_2$). According to this commonly used method the sour oil is intimately mixed with doctor solution whereupon, if sulphur is not added to the oil before treatment, sulphur in finely divided form or in solution is added and intimately mixed with the oil to break out the lead. The chemical reactions occurring in this generally used process are usually indicated as follows:

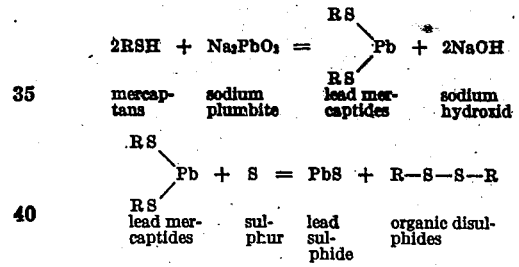

| | | | |
|---|---|---|---|
| mercaptans | sodium plumbite | lead mercaptides | sodium hydroxid |
| lead mercaptides | sulphur | lead sulphide | organic disulphides |

In the foregoing equations R represents organic radicals which may be associated with the SH group of the mercaptans. The sourness of the oils is usually attributed to the presence of mercaptans.

According to the present invention the sour oil is first treated with doctor solution by intimately mixing it with the doctor solution without the addition, as heretofore, of sulphur to break out or precipitate lead sulphide. In other words, referring to the above chemical reactions, the lead mercaptide or mercaptides are formed. The lead mercaptides are soluble in the oil and usually impart to it a yellow or greenish yellow color. Thereupon the used doctor solution is allowed to settle from the treated oil and the oil with its dissolved lead mercaptides is separated in any suitable way from the used doctor solution. The so separated and treated oil is then intimately mixed with or passed through layers of a substantially dry adsorbent or absorbent material such as absorbent earths or clays, as fuller's earth and bentonite, or activated carbon, all preferably in finely divided form, as powder. The absorbent or adsorbent materials will free the oil of, or will remove from the oil, the lead mercaptides and the resulting treated oil is sweetened. The amount of adsorbent to be employed will vary with the sourness of the oil, but sufficient adsorbent must be used to substantially free the oil of mercaptides. The completeness of the removal or absorption of the mercaptides may be determined by adding finely divided sulphur to a test portion of oil to break out lead sulphide, or any other suitable test may be applied, as will be understood by the person skilled in the art. The disappearance of the color due to mercaptides may also be used as an index of the degree of absorption.

After the oil has been treated with the absorbent, the adsorbent, for example the adsorbent clay, is separated from the oil by settling or filtering, and the absorbent clay or other adsorbent freed of oil or substantially free of oil, or containing small proportion of oil, is then intimately mixed or contacted with an aqueous caustic alkali solution, such as a water solution of sodium or potassium hydroxide.

The sodium hydroxide solution may advantageously be of the concentration usually employed in making doctor solution from litharge. The used clay may be intimately agitated with the caustic alkali at ordinary temperature or the caustic alkali solution may be used hot. During the agitation of the clay with the caustic alkali, air or oxygen or other oxidizing agent may be intimately mixed into the mass being agitated to assist in the action of regeneration or revivification. Thereupon the clay is allowed to settle from the caustic alkali solution, or is filtered therefrom. The separated liquid is capable of sweetening sour oils of the kind indicated above, and therefore is regenerated doctor solution which may be used in sweetening further quantities of sour oils. Instead of mixing the clay with the caustic alkali solution, the caustic alkali solution, either at ordinary temperature or after being heated, with or without the intimate mixture therein of air, oxygen or other oxidizing agent, may be passed through beds of the used clay or through layers of the clay supported upon the leaves of a filter press. Instead of separating the adsorbent clay from the oil before treatment with the caustic alkali or sodium hydroxide solution, the sodium hydroxide solution may be added to and intimately mixed with the mixture of adsorbent clay and oil after the action of the adsorbent clay, whereupon the clay and regenerated doctor or plumbite solution on the one hand and the treated oil on the other hand may be separated in any suitable manner. In either of the above manners of procedure, the clay may be separated from the regenerated or revivified doctor solution in any suitable manner before the solution is used, for example the separation may be accomplished by allowing the clay to settle and then drawing off the solution, or the mixture of clay and solution may be filtered.

The clay after treatment with caustic alkali as above described, may be dried or partially dried and also used to sweeten sour oils, the sour constituents of the oil reacting with the part of the lead compound still retained by the clay. Any oil or oily matters appearing in the alkali solution may be separated from the solution to prevent these being carried as impurities into the oil to be treated with the solution.

In some instances the oils treated in accordance with the present invention may contain sulphur in such form, usually considered to be elemental sulphur, which may cause the lead to partially break out as a precipitate upon treatment of the oil with doctor or plumbite solution. This precipitate is usually considered to be lead sulphide (PbS). If such precipitation occurs, the precipitate, if desired, is separated from the oil, and the oil containing the remaining organic lead sulphur compounds (the lead mercaptides) is treated in accordance with the present invention. In the event that there is sufficient elemental sulphur present to cause the decomposition of all the lead mercaptides present into lead sulphide, that is break out all the lead, or an amount of sulphur in excess of that amount is present, the oil may be distilled to reduce the sulphur content before treating it in accordance with the present process.

In the practice of the present invention, it is preferable to first remove any hydrogen sulphide from the oil with a water solution of sodium hydroxide before treating the sour oil according to the present invention. The present process may be employed before or after the usual treatment of oils with sulphuric acid.

It will be observed from the foregoing that the invention comprises forming the organic lead sulphur compounds, to wit the lead mercaptides, in the oil and thereafter treating the oil with an adsorbent such as fuller's earth, adsorbent clay etc. which upon treatment with caustic alkali will yield an alkaline solution capable of sweetening sour mineral oils. All adsorbents or absorbents possessing such properties are within the scope of my invention and I do not limit the invention to the specific adsorbents or absorbents mentioned herein. Furthermore, I do not limit myself to the use of doctor solution in forming the mercaptides or organic lead sulphur compounds, as other materials may be used to form said compounds, for example substantially dry sodium plumbite carried advantageously in or on an inert material such as kieselguhr, pumice etc., or upon an adsorptive material such as adsorbent clay, or a mixture of solid litharge and solid sodium hydroxide may be used instead of the doctor or plumbite solution, with or without the addition of a small amount of water, for example 4 to 25 per cent of the weight of the mixture. When substantially dry reagents are used to form the organic lead sulphur compound or mercaptides, the reagents are preferably used in finely divided form and intimately mixed with the sour oil or the sour oil is passed through layers of the finely divided reagents.

From the researches which have been conducted to ascertain the nature of the action of the adsorbent, it appears that the lead mercaptides or organic lead sulphur compounds are absorbed by the adsorbent and immediately decomposed into lead oxide and organic disulphides by oxygen or air occluded or found in the adsorbent, according to the following equation, to wit,

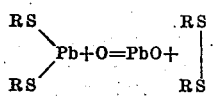

The action of the caustic alkali appears to be to dissolve the lead oxide to form fresh doctor or plumbite solution. While the above explanations of the chemical reactions involved are given it is to be understood that I do not limit myself thereto, it being understood that the patent laws do not require the statement of the reasons for the action of a process or an explanation of the reasons why a certain result is obtained, it being sufficient to state in such detail as required by the patent laws the manner of using and practicing the invention and of accomplishing the results stated, and in the foregoing specification this has been done.

The constituents or compounds imparting the sour condition to sour mineral or hydrocarbon oils are largely, if not wholly, mercaptans. The said constituents or compounds in sour hydrocarbon or mineral oil are collectively referred to herein and in the claims as mercaptans; and the organo-metallic compounds or organic sulphur metal compounds which said constituents or compounds form with lead compounds, such as sodium plumbite and with doctor solution, are collectively referred to herein and in the claims as lead mercaptide or lead mercaptides.

I claim:

1. The process of sweetening sour mineral oil which comprises contacting it with a lead oxide-sodium hydroxide mixture to form organic lead sulphur compounds therein, contacting the so treated oil, while it contains organic lead sulphur compounds, with an adsorbent material, thereafter contacting the adsorbent material with caustic alkali solution to dissolve lead in combination contained therein, and using the said dissolved lead in the sweetening of further quantities of sour mineral oil.

2. The process of sweetening sour mineral oil which comprises contacting it with alkali plumbite to form lead mercaptide therein, contacting the so treated oil, while it contains lead mercaptide, with an adsorbent, thereafter contacting the adsorbent with caustic alkali solution and using the said alkali solution after contact with said adsorbent as the alkali plumbite in the sweetening of further quantities of sour mineral oil.

3. The process of sweetening sour hydrocarbon oil which comprises contacting said oil with plumbite solution thereby producing lead mercaptides, contacting said so treated oil with an adsorbent material to remove lead mercaptides from the oil, thereafter separating the adsorbent material from the oil being treated, and subjecting the adsorbent material to the action of caustic alkali solution thereby converting lead compound associated with the adsorbent into plumbite solution, and then contacting said plumbite solution in the aforesaid step with a further quantity of sour hydrocarbon oil.

4. The process of sweetening sour hydrocarbon oil which comprises contacting said oil with plumbite solution thereby producing lead mercaptides, contacting said so treated oil with an adsorbent material to remove lead mercaptides from the oil, subjecting the adsorbent material to the action of caustic alkali solution thereby converting lead compound taken up by the adsorbent material into plumbite solution, and then contacting said plumbite solution in the aforesaid step with a further quantity of sour hydrocarbon oil.

5. In the process of sweetening sour hydrocarbon oil wherein the said oil has been treated to form therein lead mercaptides and the oil containing the said mercaptides was then treated with an adsorbent material to remove lead mercaptides from the oil, the steps of treating the so employed adsorbent material which contains lead compound derived from said mercaptides with a caustic alkali solution in the presence of an oxygen containing fluid, thereby converting the said lead compound into an alkali plumbite solution, and contacting the said plumbite solution with a further quantity of sour hydrocarbon oil to be sweetened.

6. Process for sweetening sour hydrocarbon oil which comprises contacting said sour oil with plumbite solution to form lead mercaptide in said oil, contacting said so treated oil, while it contains lead mercaptide, with an adsorbent material to remove lead mercaptide, thereafter separating adsorbent material from oil so treated, subjecting the adsorbent material to the action of caustic alkali solution to form a solution of a lead compound, and thereafter contacting said latter solution with a further quantity of sour hydrocarbon oil in the sweetening thereof.

7. In the art of treating hydrocarbon oil containing lead mercaptide with an adsorbent material, the step of contacting the adsorbent material with a caustic alkali solution after the action of the adsorbent material on the lead mercaptide and while the said adsorbent material contains lead compound taken up from said lead mercaptide.

8. Process for sweetening sour hydrocarbon oil which comprises contacting it with plumbite solution to form lead mercaptide therein, contacting the so treated oil, while it contains lead mercaptide, with an adsorbent material, thereafter contacting the adsorbent material with a caustic alkali solution in the presence of an oxygen containing fluid, thereby converting lead compound taken up by the adsorbent material into plumbite solution, and using said latter plumbite solution in sweetening a further quantity of sour hydrocarbon oil.

OSCAR CODIER.